(12) United States Patent
Banerjee et al.

(10) Patent No.: US 12,340,347 B2
(45) Date of Patent: Jun. 24, 2025

(54) SYSTEMS AND METHODS FOR CONVEYING INFORMATION ABOUT A TRAFFIC EVENT VIA VEHICLE COMMUNICATIONS

(71) Applicant: Ford Global Technologies, LLC, Dearborn, MI (US)

(72) Inventors: Subharthi Banerjee, Dearborn, MI (US); Somak Datta Gupta, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 222 days.

(21) Appl. No.: 18/145,427

(22) Filed: Dec. 22, 2022

(65) Prior Publication Data

US 2024/0211881 A1    Jun. 27, 2024

(51) Int. Cl.
     *G06Q 40/08*      (2012.01)
     *G06Q 10/10*      (2023.01)
     (Continued)

(52) U.S. Cl.
     CPC .............. *G06Q 10/10* (2013.01); *G06Q 40/08* (2013.01); *G08G 1/0112* (2013.01);
     (Continued)

(58) Field of Classification Search
     CPC ...... G06Q 10/10; G06Q 40/08; G08G 1/0112; G08G 1/0133; G08G 1/0141; G08G 1/0116; H04N 5/76; H04N 7/181; H04N 7/188

USPC ......... 705/35, 40, 37, 38, 39, 4, 5; 348/148; 701/425; 709/226, 201, 227; 455/406; 706/25, 45
See application file for complete search history.

(56) References Cited

U.S. PATENT DOCUMENTS

| 8,159,535 B2 | 4/2012 | Kitani et al. |
|---|---|---|
| 10,787,122 B2 | 9/2020 | Adams et al. |
| (Continued) | | |

OTHER PUBLICATIONS

A Survey of Vehicular Network Systems for Road Traffic Management (English); IEEE Access (vol. 10, 2022, pp. 42365-42385); Karol Jurczenia, Jacek Rak; Jan. 1, 2022. (Year: 2022).*

(Continued)

*Primary Examiner* — Tien C Nguyen
(74) *Attorney, Agent, or Firm* — Emily Drake; Eversheds Sutherland (US) LLP

(57) ABSTRACT

This disclosure is generally directed to systems and methods pertaining to a group of vehicles that cooperatively provide information about a traffic event. In an example embodiment, a method executed by a first processor in a first vehicle may involve detecting a trigger condition that portends a traffic event. The first vehicle may form a video sharing group with one or more other vehicles. At least one vehicle of the video sharing group may capture a video recording of the traffic event and share the video recording with members of the video sharing group. The video recording may contain information that is useable for various purposes. In an example scenario, a reporting vehicle of the video sharing group may transmit the video recording to a server computer that is configured to allow for further operations such as, for example, initiating an insurance procedure and/or filing a police report.

20 Claims, 8 Drawing Sheets

(51) Int. Cl.
*G08G 1/01* (2006.01)
*H04N 5/76* (2006.01)
*H04N 7/18* (2006.01)

(52) U.S. Cl.
CPC ......... *G08G 1/0133* (2013.01); *G08G 1/0141* (2013.01); *H04N 5/76* (2013.01); *H04N 7/181* (2013.01); *H04N 7/188* (2013.01)

(56) References Cited

U.S. PATENT DOCUMENTS

| | | | |
|---|---|---|---|
| 11,597,395 B2* | 3/2023 | Ucar | G06N 20/00 |
| 11,727,794 B2* | 8/2023 | Bielby | G08G 1/017 |
| | | | 701/119 |
| 2007/0271234 A1* | 11/2007 | Ravikiran | G06F 16/2471 |
| 2013/0164715 A1* | 6/2013 | Hunt | G09B 9/052 |
| | | | 434/65 |
| 2014/0002651 A1* | 1/2014 | Plante | G07C 5/0866 |
| | | | 348/148 |
| 2014/0143004 A1* | 5/2014 | Abhyanker | G06Q 30/02 |
| | | | 705/7.19 |
| 2017/0134516 A1* | 5/2017 | Gutman | H04L 67/55 |
| 2019/0052724 A1* | 2/2019 | Dancel | H04L 63/107 |
| 2021/0258486 A1 | 8/2021 | Fields et al. | |
| 2021/0303137 A1 | 9/2021 | Adenwala et al. | |
| 2022/0351137 A1* | 11/2022 | Rosenblatt | G07C 5/008 |

OTHER PUBLICATIONS

A Data Management Perspective on Vehicular Networks; IEEE Communications Surveys & Tutorials (vol. 17, Issue: 4, 2015, pp. 2420-2460); Sergio Ilarri, Thierry Delot, Raquel Trillo-Lado; Aug. 24, 2015. (Year: 2015).*

Lili Miao et al., PC5-Based Cellular-V2X Evolution and Deployment, Sensors 2021, 21, 843, Dec. 9, 2020, 1-14.

* cited by examiner

SYSTEMS AND METHODS FOR CONVEYING INFORMATION ABOUT A TRAFFIC EVENT VIA VEHICLE COMMUNICATIONS

BACKGROUND

A traffic related mishap can often be traumatizing and one or more persons involved in the mishap may, in at least some cases, be too shaken up to take suitable action in a timely manner. Furthermore, accounts of the mishap that may be provided by various persons involved in the mishap and/or by witnesses, can be sometimes inaccurate, vague, or skewed as a result of personal bias. It is therefore desirable to provide a solution that addresses this issue.

BRIEF DESCRIPTION OF THE DRAWINGS

A detailed description is set forth below with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
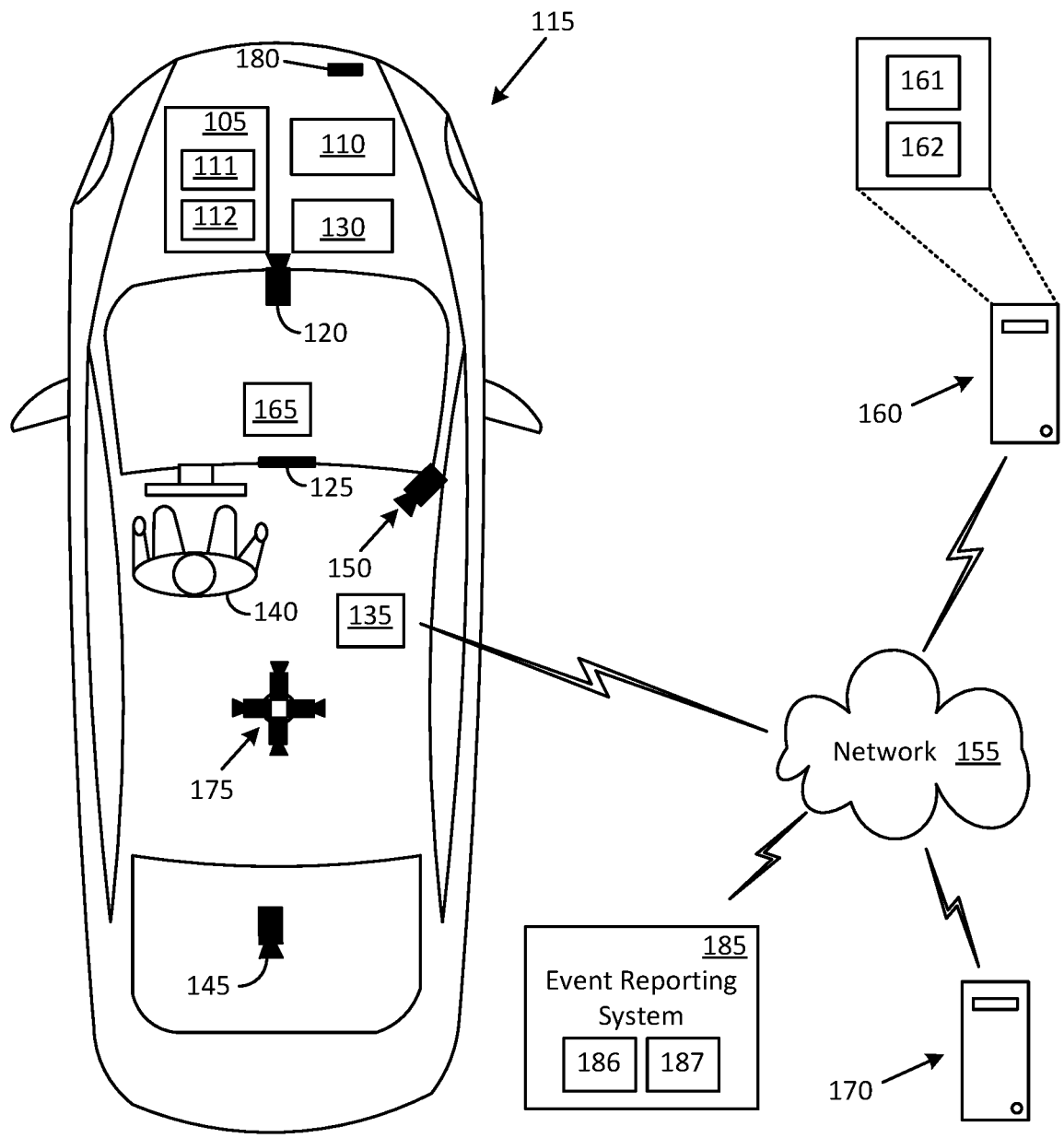
FIG. 1 illustrates an example vehicle that includes an event reporting system in accordance with an embodiment of the disclosure.

In terms of a general overview, certain embodiments described in this disclosure are directed to systems and methods pertaining to a group of vehicles that cooperatively provide information about a traffic event. In an example embodiment, a method executed by a first processor in a first vehicle may involve detecting a trigger condition that portends a traffic event. One example trigger condition can be a less than desirable separation distance between two vehicles moving on a road. Another example trigger condition can be a hard braking maneuver performed by a vehicle. The first vehicle may form a video sharing group with one or more other vehicles nearby and one or more intelligent roadside infrastructure elements located nearby. At least one vehicle of the video sharing group and/or an intelligent roadside infrastructure element of the video sharing group may capture a video recording of the traffic event and share the video recording with at least some members of the video sharing group. The video recording may contain information that is useable for various purposes such as, for example, an insurance purpose and/or a police report. In an example scenario, a reporting vehicle and/or an intelligent roadside infrastructure element of the video sharing group may transmit the video recording to a server computer that is configured to allow for further operations involving the video recording. Some example operations can include filing an insurance claim and filing a police report.

Illustrative Embodiments

The disclosure will be described more fully hereinafter with reference to the accompanying drawings, in which example embodiments of the disclosure are shown. This disclosure may, however, be embodied in many different forms and should not be construed as limited to the example embodiments set forth herein. It will be apparent to persons skilled in the relevant art that various changes in form and detail can be made to various embodiments without departing from the spirit and scope of the present disclosure. Thus, the breadth and scope of the present disclosure should not be limited by any of the above-described example embodiments but should be defined only in accordance with the following claims and their equivalents. The description below has been presented for the purposes of illustration and is not intended to be exhaustive or to be limited to the precise form disclosed. It should be understood that alternate implementations may be used in any combination desired to form additional hybrid implementations of the present disclosure. For example, any of the functionality described with respect to a particular device or component may be performed by another device or component. Furthermore, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments.

Certain words, terms, and phrases that are used in this disclosure must be interpreted as referring to various objects and actions that are generally understood in various forms and equivalencies by persons of ordinary skill in the art. More particularly, the word "vehicle" as used in this disclosure can pertain to any one of various types of vehicles such as, for example, cars, vans, sports utility vehicles, trucks, electric vehicles, gasoline vehicles, and hybrid vehicles. Furthermore, the description provided herein is applicable to various vehicles incorporating various kinds of driving automation such as, for example, the six levels of driving automation that is defined by the Society of Automotive Engineers (SAE) as ranging from Level 0 (fully manual) to Level 5 (fully autonomous). It must be understood that the description below with reference to various actions performed by a driver can be performed by a computer when the vehicle is an autonomous vehicle.

The phrase "traffic event" as used herein refers to any scenario such as, for example, where two or more vehicles come in physical contact with each other, where a vehicle comes in physical contact with an object, and/or where a vehicle suffers a malfunction (engine failure, abrupt stop with or without coming in contact with another vehicle or an object, etc.).

The word "image" as used herein may be any of various types of images captured by any of various types of image capture devices (still camera, digital camera, video camera, smartphone, etc.). The various types of images can include still digital images, photographs, video clips, real-time video, movies, still frames etc. A still frame is a single static image that may be obtained from a video clip or a video stream. A video clip is generally composed of a set of images that are captured sequentially over a period of time. Thus, a description herein with respect to a video clip is equally applicable to a single image or photograph.

The word "software" as used herein encompasses any of various forms of computer code and may be provided in various forms such as in the form of a software package, a firmware package, retail software, or Original Equipment Manufacturer (OEM) software. The word "cooperate," as used herein with reference to two or more devices or vehicles, refers to operations such as transferring information between the devices or vehicles. It must be understood that words such as "implementation," "configuration," "application," "scenario," "situation," "case," and "situation" as used herein represent abbreviated versions of the phrase "In an example ("implementation," "configuration," "application," "scenario," "situation," "case," "approach," and "situation") in accordance with the disclosure." It must also be understood that the word "example" as used herein is intended to be non-exclusionary and non-limiting in nature.

FIG. 1 illustrates an example vehicle 115 that is configured to execute various operations in accordance with the disclosure. The vehicle 115 can include various components such as, for example, a vehicle computer 110, an event reporting system 105, an infotainment system 125, a detector system 130, a global positioning satellite (GPS) system 165, and a communication system 135. The vehicle computer 110 may perform various functions such as, for example, controlling engine operations (fuel injection, speed control, emissions control, braking, etc.), managing climate controls (air conditioning, heating etc.), detecting airbag activations, detecting component failures, detecting engine malfunctions, and issuing warnings (check engine light, bulb failure, low tire pressure, vehicle in blind spot, etc.). In some cases, the vehicle computer 110 may include more than one computer such as, for example, a first computer that controls engine operations and a second computer that operates the infotainment system 125.

The event reporting system 105 can include a processor 111 and a memory 112 in which is stored computer-executable instructions that are executed by the processor 111 to enable the event reporting system 105 to perform various operations in accordance with the disclosure. In an example implementation, the event reporting system 105 can be configured as a standalone computer that is communicatively coupled to the vehicle computer 110 and other devices in the vehicle 115. In this configuration, the event reporting system 105 can obtain from the vehicle computer 110 and one or more of the other devices (camera, sensor, etc.), information pertaining to a traffic event. In another example implementation, the event reporting system 105 can be a part of the vehicle computer 110 and share some components with the vehicle computer 110, such as, for example a processor and a memory.

The detector system 130, which is coupled to the event reporting system 105, can include various types of image capture devices, detectors, and sensors such as, for example, an accelerometer, a video camera, a digital camera, an infrared camera, an object detector, a distance sensor, a proximity sensor, an audio sensor, a light detection and ranging (LIDAR) device, a radar device, and/or a sonar device. In the illustrated example embodiment, the detector system 130 includes a camera 120, a camera 150, a camera 145, a camera 175, and an accelerometer 180, each of which is coupled to the event reporting system 105.

The camera 120 can be any of various types of image capture devices mounted at any of various locations on a front section of the vehicle 115 such as, for example, on a front bumper, on a hood, above a registration plate, or in the engine compartment. The camera 120 is arranged to capture images of objects located ahead of the vehicle 115. The images may be captured in any of various forms such as, for example, in the form of a still picture, a video clip, or a live video stream.

The camera 145 can be any of various types of image capture devices mounted at any of various locations on a rear section of the vehicle 115, such as, for example, on a rear window, a rear bumper, or trunk of the vehicle 115. The camera 145 is arranged to capture images of objects located behind the vehicle 115.

The camera 150 can be any of various types of image capture devices mounted at any of various locations in a cabin area of the vehicle 115 such as, for example, on a dashboard, a side pillar, a rear-view mirror, or a ceiling of the vehicle 115. The camera 150 is arranged to capture images of the occupants of the vehicle 115.

The camera 175 can be any of various types of image capture devices mounted upon a top portion of the vehicle 115 and arranged to capture images of objects in any of various directions with respect to the vehicle 115. In an example implementation, the camera 175 is installed upon a motor-driven rotatable mount and the event reporting system 105 can control a motor of the motor-driven rotatable mount for rotating the camera 175 around a vertical axis. Thus, the camera 175 can have a 360° field of view. In another example implementation, the camera 175 is provided in the form of a camera assembly having multiple cameras pointed in several directions (east, west, south, north, for example). The event reporting system 105 can activate any one or more of the cameras in order to capture images of objects located at any of various locations around the vehicle 115.

The accelerometer 180, which may also be referred to as a "g sensor," produces a sensor signal upon detecting an abrupt change in movement of the vehicle 115, such as, for example, a sudden deceleration or a stoppage of the vehicle 115. The sensor signal is conveyed to the event reporting system 105, and the processor 111 in the event reporting system 105 may evaluate the sensor signal to determine whether the braking action portends a traffic event.

In an example implementation, the processor 111 may compare the sensor signal to a threshold sensor signal value and determine that the braking is unlikely to precede a traffic event because an amplitude of the sensor signal is lower than the threshold sensor signal value. In this case, the processor 111 may desist from taking further actions related to recording and/or reporting a traffic event.

In another example implementation, the processor 111 may determine that the braking portends a traffic event because an amplitude of the sensor signal exceeds the threshold sensor signal value. In this case, the processor 111 may configure one or more of the cameras such as, for example, the camera 120 and/or the camera 175, to execute a video capture procedure of objects located in front of the vehicle 115 and/or around the vehicle 115. In some scenarios, the processor 111 may also configure the camera 145 to execute a video capture procedure of objects located behind the vehicle 115.

The video capture procedures can produce video recordings that include real-time video footage prior to, at the time of, and after, the moment of occurrence of a traffic event. In an example implementation, the video recordings produced by multiple cameras may be stored in the memory 112 and evaluated by the processor 111 for making a determination as to which one or more of the video recordings contains information that is pertinent to the traffic event. Thus, for example, in one case, the processor 111 may determine that a video recording produced by the camera 120 contains information that is pertinent to a traffic event. The traffic event in this case may involve the vehicle 115 coming in contact with a vehicle in front of the vehicle 115. In another case, the processor 111 may determine that a video recording produced by the camera 145 contains information that is pertinent to a traffic event. The traffic event in this case may involve the vehicle 115 coming in contact with a vehicle that is moving behind the vehicle 115.

In some cases, the processor 111 may determine that a video recording produced by the camera 150 contains information that supplements, complements, or replaces a video recording captured by one or more of the other cameras. In such cases, the processor 111 may, for example, evaluate the video recording to determine a physical condition of one or more occupants of the vehicle 115 after the occurrence of a traffic event. In some scenarios, the video recording may contain information that is pertinent for use for various purposes such as, for example, to file an insurance claim, to file a police report, or to assist emergency services (medical personnel, for example).

The infotainment system 125 can be an integrated unit that includes various components such as a radio, a CD player, a clock, and a video player. In an example implementation, the infotainment system 125 has a display that includes a graphical user interface (GUI) for use by the driver 140 of the vehicle 115. The GUI may be used for various purposes including, for example, to input various types of information after an occurrence of a traffic event. In an example scenario, the GUI may be used by the driver 140 to provide to the event reporting system 105, information pertaining to a physical status and/or a mental condition of the driver 140 and/or of other occupants of the vehicle 115 (injured, healthy, rational, disoriented, etc.).

The GPS system 165 may be communicatively coupled to the infotainment system 125 for providing navigation information and may also be communicatively coupled to the event reporting system 105 for providing location information after the occurrence of a traffic event. In an example implementation, the event reporting system 105 may combine the location information provided by the GPS system 165 with time information obtained from a clock (not shown) in order to create a time-stamped video recording that includes location information. The clock can be a part of the event reporting system 105 or can be a part of the infotainment system 125.

The communication system 135 can include wired and/or wireless communication devices mounted in or on the vehicle 115 in a manner that supports various types of communications such as, for example, communications between the event reporting system 105, the detector system 130, and the vehicle computer 110. The communication system 135 may utilize one or more of various wired and/or wireless technologies for this purpose, such as, for example, Bluetooth®, Ultra-Wideband (UWB), Wi-Fi, Zigbee®, Li-Fi (light-based communication), audible communication, ultrasonic communication, and/or near-field-communications (NFC).

The event reporting system 105 and the vehicle computer 110 can also utilize the communication system 135 to communicate with one or more devices that are located outside the vehicle 115, such as, for example, a computer 160, a computer 170, and/or an event reporting system 185.

The computer 160 can include a processor 161 and a memory 162 in which is stored computer-executable instructions that are executed by the processor 161 for performing various operations in accordance with the disclosure. In addition to the computer-executable instructions, the memory 162 may be used to store video recordings conveyed to the computer 160 by the event reporting system 105.

In an example implementation, the computer 160 can be a server computer that is configured to be accessible by various devices such as the event reporting system 105, the computer 170, and the event reporting system 185. The access may be provided for various purposes such as, for example, to allow the computer 170 to access the video recordings as a part of a procedure to process an insurance claim or as a part of a procedure to file a police report.

In an example implementation, the computer 160 and/or the computer 170 can be owned and/or operated by an insurance company and the insurance company may use the video recordings to process an insurance claim. In another example implementation, the computer 160 and/or computer 170 can be owned and/or operated by a law enforcement agency that may use the video recordings to process or file a police report.

In an example implementation, the event reporting system 185 may be provided in another vehicle (not shown) or in an intelligent roadside infrastructure element (not shown). The event reporting system 185 can include a processor 186 and a memory 187 in which is stored computer-executable instructions that are executed by the processor 186. At least a portion of the computer-executable instructions can include software in the form of an event reporting system module that may carry out various operations in accordance with the disclosure by use of video recordings conveyed to the event reporting system 185 by the event reporting system 105 and stored in the memory 187.

Communications between the communication system 135 and devices such as, for example, the computer 160, the computer 170, and the event reporting system 185 may be carried out via a network 155. The network 155 may include any one network, or a combination of networks, such as, for example, a local area network (LAN), a wide area network (WAN), a telephone network, a cellular network, a cable network, a wireless network, and/or private/public networks such as the Internet.

The network 155 may support one or more types of communication technologies such as, for example, Transmission Control Protocol/Internet Protocol (TCP/IP), Cellular, Bluetooth®, Ultra-Wideband, near-field communication (NFC), Wi-Fi, Wi-Fi direct, Li-Fi, vehicle-to-vehicle (V2V) communications, vehicle-to-infrastructure (V2I) communications, and vehicle-to-everything (V2X) communications.

Figure 2:
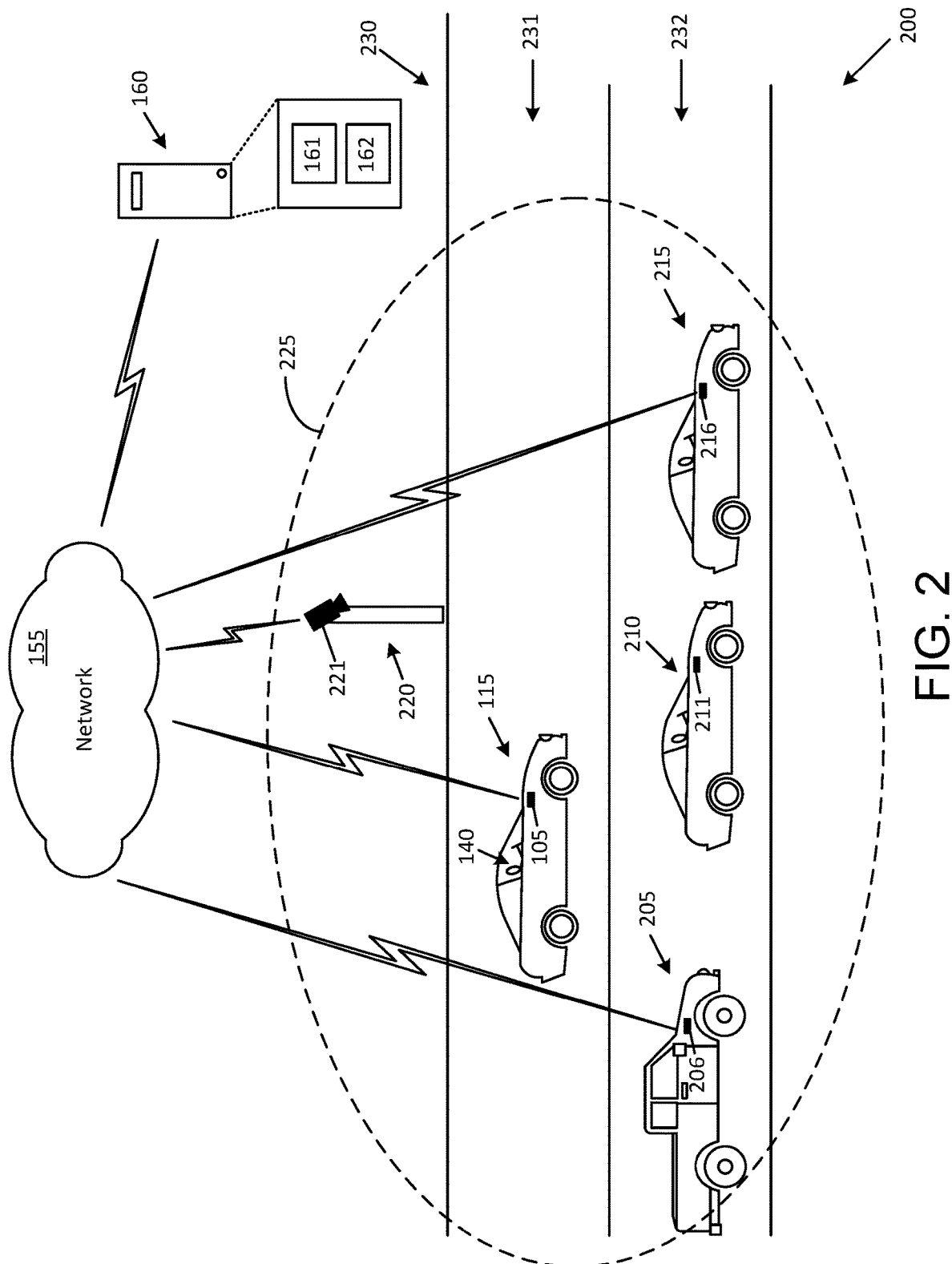
FIG. 2 illustrates a first example scenario where the event reporting system of the vehicle performs certain operations in accordance with the disclosure.

FIG. 2 illustrates a first example scenario where the event reporting system 105 of the vehicle 115 performs certain operations in accordance with the disclosure. The various objects illustrated in FIG. 2 are example objects associated with an event reporting system 200 in accordance with an embodiment of the disclosure. In this example scenario, the vehicle 115 is traveling in a lane 231 of a two-lane highway 230, and three other vehicles are traveling in an adjacent lane 232 of the two-lane highway 230. In other scenarios, the various vehicles may be traveling on a single-lane road or on a multi-lane highway having more than two lanes in either direction of travel.

The three vehicles traveling in the lane 232 include a vehicle 205 having an event reporting system 206, a vehicle 210 having an event reporting system 211, and a vehicle 215 having an event reporting system 216. In another example scenario, the vehicle 210 and/or the vehicle 215 may not include an event reporting system.

In the illustrated example scenario, the event reporting system 105 of the vehicle 115 detects the occurrence of a trigger condition involving the vehicle 210 and the vehicle 215. In this case, the trigger condition involves a less than desirable separation distance between the vehicle 210 and the vehicle 215. The less than desirable separation distance may be attributable to various factors such as, for example, an inexperienced driver in the vehicle 210 and/or poor driving conditions such as poor visibility due to rain and/or fog.

In another case, the trigger condition involving the vehicle 210 and the vehicle 215 may be characterized by the brake lights of the vehicle 210 and/or of the vehicle 215 turning on in response to a hard braking maneuver carried out by the driver of the 215 and/or a driver of the vehicle 210.

In yet another case, the trigger condition involving the vehicle 210 and the vehicle 215 may be characterized by one or both vehicles sliding on a slick road surface.

The processor 111 of the event reporting system 105 may detect the trigger condition (undesirably small separation distance, brake light activation, sliding condition, etc.) based on evaluating images obtained by the event reporting system 105 from one or more of the cameras provided in the vehicle 115, and/or based on evaluating signals obtained from one or more sensors provided in the vehicle 115. The event reporting system 105 may then make a determination whether these actions portend a traffic event. If the determination indicates a possibility of an occurrence of the traffic event, the processor 111 may launch operations to form a video sharing group, such as by sending request to other vehicles to join the video sharing group.

As a part of the operations, the processor 111 may define a zone 225, which, in the illustrated example scenario, encompasses the vehicle 115, the vehicle 210, and the vehicle 215. The zone 225 may further include, in at least some scenarios, one or more intelligent roadside infrastructure elements such as, for example, an intelligent roadside infrastructure element 220 that is located on a sidewalk of the two-lane highway 230.

The intelligent roadside infrastructure element 220 may include a camera 221, an event reporting system (not shown), and a communication system (not shown). The communication system can be configured to convey images captured by the camera 221 to one or more devices such as, for example, the computer 160 and/or the computer 170 described above. The images may be conveyed to the various devices via the network 155.

In an example implementation, the zone 225 may be defined on the basis of one or more vehicles and one or more intelligent roadside infrastructure elements having a line-of-sight visibility with respect to the vehicle 210 and the vehicle 215. Accordingly, in a first scenario, the zone 225 may have a first perimeter encompassing a first group of vehicles based on a first set of factors such as, for example, a first traffic density, a first time of day or night, and/or a first set of a second set of conditions (rain, visibility, etc.) at the location in which the vehicle 115 and nearby vehicles are moving. In a second scenario, the zone 225 may have a perimeter that is different in size than the first perimeter, and may encompass a different group of vehicles, based on a second set of factors such as, for example, a second traffic density, a second time of day or night, and/or a second set of conditions at the location in which the vehicle 115 and nearby vehicles are moving.

In an example scenario, the zone 225 may change in size and shape in a dynamic manner in accordance with various factors such as, for example, in accordance with traffic density and speed of individual vehicles. In another example scenario, the zone 225 may be configured to move along with one or more vehicles such as, for example, move along with a vehicle that created the zone 225.

Figure 3:
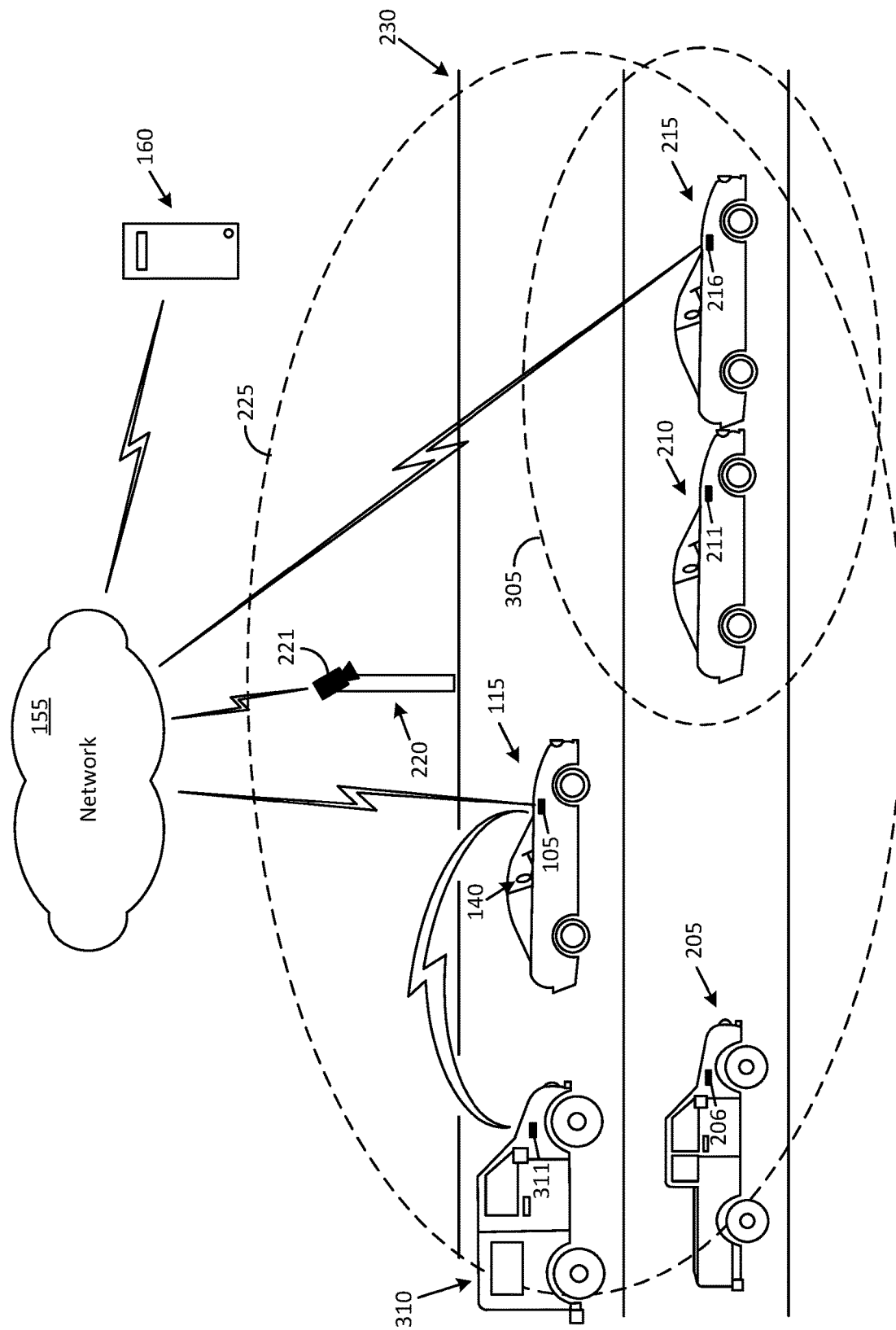
FIG. 3 illustrates a second example scenario where the event reporting system of the vehicle performs certain operations in accordance with the disclosure.

FIG. 3 illustrates a second example scenario where the event reporting system 105 of the vehicle 115 performs certain operations in accordance with the disclosure. The second example scenario may be viewed as a sequel to the first example scenario described above. Specifically, the trigger condition described above with respect to the vehicle 210 and the vehicle 215 in the first example scenario portends the example traffic event illustrated in FIG. 3. The traffic event in this case involves contact between the vehicle 210 and the vehicle 215. Upon detecting the trigger condition, the vehicle 115 and other members of the group that are located inside the zone 225, may initiate recording procedures for capturing video recordings of the traffic event. The video recordings can be shared among one or more members of the video sharing group and with devices such as, for example, the computer 160, which can be a server computer.

In an example implementation, a sub-zone 305 that encompasses at least the vehicles involved in the traffic event may be created. The sub-zone 305 would typically have a perimeter that is smaller in size than the perimeter of the zone 225 and includes a sub-set of the vehicles that are a part of the group of vehicles encompassed by the zone 225. In an example scenario, the sub-zone 305 may be defined as fixed zone that includes one or more vehicles that are involved in a traffic event. If the vehicles are stationary, the sub-zone 305 may remain stationary. In an example implementation, the zone 225 is configured to remain stationary with respect to the sub-zone 305. In another example implementation, the zone 225 is configured to move with respect to the sub-zone 305.

In any of such implementations, one or more vehicles may either enter or exit the zone 225 and the sub-zone 305. In the illustrated scenario, a vehicle 310 is shown entering the zone 225. The event reporting system 105 of the vehicle 115 may detect the entry and may communicate with an event reporting system 311 of the vehicle 310 (by use of V2V communications, for example), to provide the vehicle 310 an opportunity to join the video sharing group.

Figure 4A:
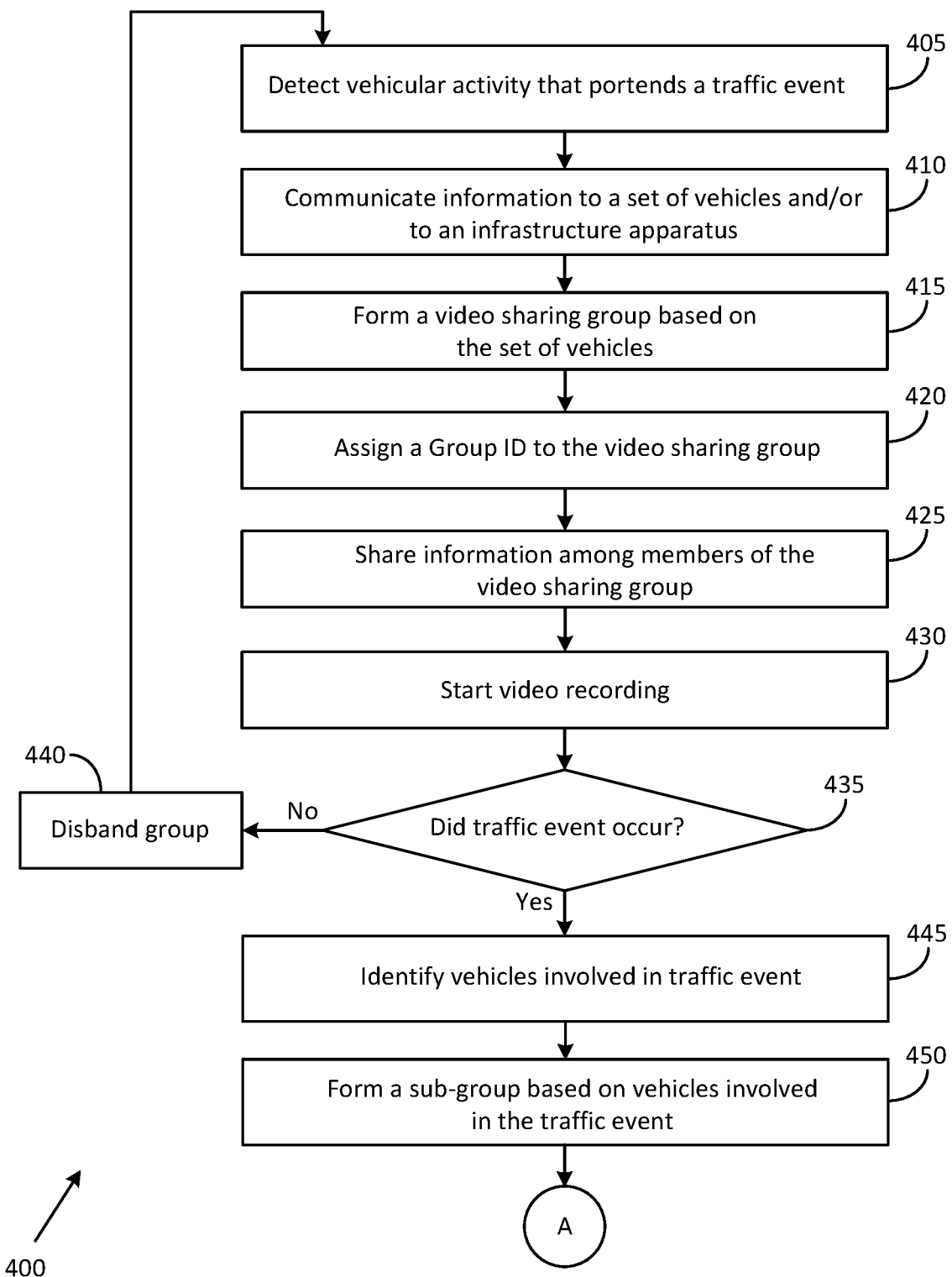
FIGS. 4A and 4B show a flowchart of a method of reporting a traffic event in accordance with an embodiment of the disclosure.
Figure 4B:
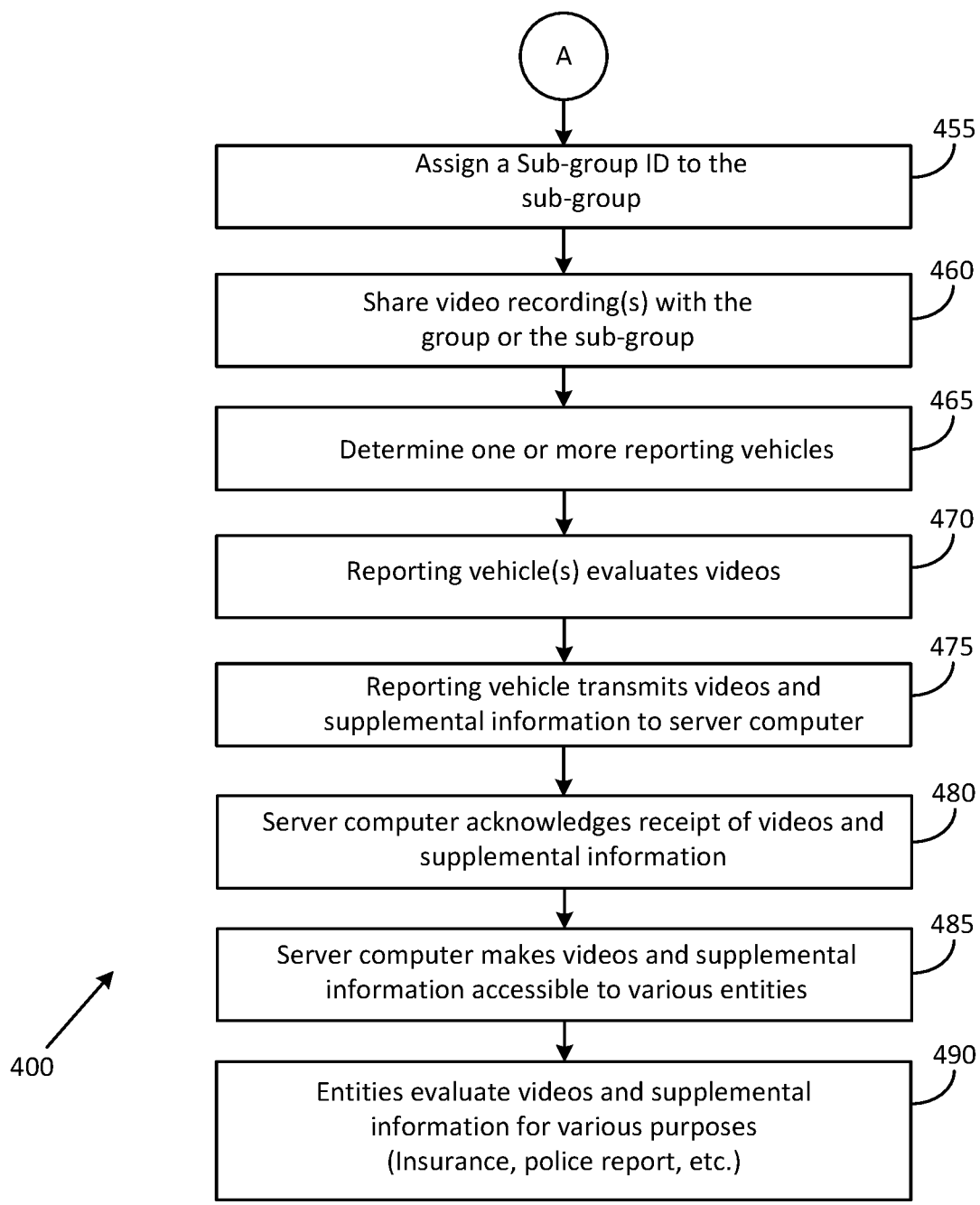

FIGS. 4A and 4B show a flowchart 400 of a method of reporting a traffic event in accordance with an embodiment of the disclosure. The flowchart 400 illustrates a sequence of operations that can be implemented in hardware, software, or a combination thereof. In the context of software, the operations represent computer-executable instructions stored on one or more non-transitory computer-readable media, such as, for example, the memory 112 of the event reporting system 105 or a memory contained in a computer provided in any of the vehicles or devices referred to herein, that, when executed by one or more processors, such as the processor 111 of the event reporting system 105, or a processor contained in a computer provided in any of the vehicles or devices referred to herein, perform the recited operations. Generally, computer-executable instructions include routines, programs, objects, components, data structures, and the like that perform particular functions or implement particular abstract data types. The order in which the operations are described is not intended to be construed as a limitation, and any number of the described operations may be carried out in a different order, omitted, combined in any order, and/or carried out in parallel. Various operations described in the flowchart 400 may be executed by the processor 111 of the event reporting system 105 and/or by a processor in any of the various vehicles and devices described above. The description below may make reference to certain components and objects shown in other figures but it should be understood that this is done for purposes of explaining certain aspects of the disclosure and that the description is not limited to these component and objects and are equally applicable to various other objects and components in various embodiments.

At block 405, a first vehicle, such as, for example, the vehicle 115, detects a trigger condition that portends a traffic event. One example of a trigger condition and a traffic event is described above with reference to the vehicle 210 and the vehicle 215. Other examples of a trigger condition can include an improper lane change maneuver, an obstacle lying on a road, a slick road surface, and poor visibility. Other examples of a traffic event can include a vehicle making unintended contact with an object other than another vehicle (such as, for example, an individual, a tree, a building, a traffic light pole etc.) or a vehicle going off a road (due to a poor road condition or a poor driver, for example).

At block 410, the first vehicle communicates with one or more other vehicles and/or one or more intelligent roadside infrastructure elements in the vicinity of the first vehicle and/or within line-of-sight of one or more vehicles that may be affected by the trigger condition. In an example implementation, the first vehicle transmits a wireless broadcast message inviting other vehicles and/or intelligent roadside infrastructure elements to enroll in a video sharing group. In another example implementation, the first vehicle transmits a wireless message to specific vehicles and and/or intelligent roadside infrastructure elements that the first vehicle determines would be optimal for forming the video sharing group. For example, the vehicle 115 shown in FIG. 2 may transmit a V2V message to the vehicle 205 and a V2I message to the intelligent roadside infrastructure element 220 that the vehicle 115 identifies as being most suitable for forming a video sharing group based on the vehicle 205 and the intelligent roadside infrastructure element 220 having line-of-sight visibility to the vehicle 210 and the vehicle 215 that may be involved in a traffic event as a result of the vehicle 210 traveling too close to the vehicle 215. In an example scenario, the first vehicle 115 may select and transmit the wireless message to the intelligent roadside infrastructure element 220 based on determining that the intelligent roadside infrastructure element 220 is located within a threshold distance of the vehicle 115 and/or of a spot of occurrence of the trigger condition.

In another example implementation, the first vehicle may define a zone such as, for example, the zone 225 described above, and wirelessly communicate with all vehicles and/or intelligent roadside infrastructure elements that are located inside the zone 225.

At block 415, the first vehicle may form a video sharing group based on responses received from vehicles and/or intelligent roadside infrastructure elements that indicate an acceptance of the invitation sent out by the first vehicle for forming a video sharing group. Forming of the video sharing group may include forming of a zone, such as, for example, the zone 225 described above.

At block 420, a group identifier is assigned to the video sharing group. In an example implementation, the group identifier is assigned by the first vehicle. Various other items of information such as, for example, a zone identity, a group name, a location identification, and/or a time identification may be associated with the video sharing group.

At block 425, the first vehicle and other members of the video sharing group may exchange information with each other such as, for example, the group identifier, and a Layer 2 identification information. In an example scenario, the Layer 2 ID information is a media access control (MAC) address of a computer that operates as an event reporting system (MAC address of the event reporting system 105, for example).

At block 430, one or more vehicles and/or intelligent roadside infrastructure elements start capturing video footage of the vehicles associated with the trigger condition. In some cases, one or more cameras of a vehicle or an intelligent roadside infrastructure element may be configured to capture real-time video irrespective of the occurrence of a trigger condition. In these cases, an event reporting system of the vehicle or the intelligent roadside infrastructure element may ensure that the video footage includes video frames of the vehicle(s) that may be involved in a traffic event following detection of the trigger condition. The event reporting system may also ensure that various types of supplemental information is appended to the video footage. The supplemental information can include, for example, a group identifier, Layer 2 ID information, location information (GPS coordinates, for example), and time information (timestamps, for example).

In some other cases, one or more cameras of a vehicle or an intelligent roadside infrastructure element may be activated by an event reporting system of the vehicle or the intelligent roadside infrastructure element, based on formation of the group and/or obtaining information about the trigger condition. The event reporting system may ensure that various types of supplemental information is appended to the video footage. The supplemental information can include, for example, a group identifier, Layer 2 ID information, location information (GPS coordinates, for example), and time information (timestamps, for example).

At block 435, a determination is made whether a traffic event has occurred as a result of the trigger condition. In an example implementation, the determination may be made by each event reporting system of each vehicle and intelligent roadside infrastructure element in an independent manner based on evaluation of images by the event reporting system. In another example implementation, the determination may be made cooperatively based on actions and communications between two or more event reporting systems of the group.

In an example scenario, the determination at block 435 may indicate that no traffic event has occurred. For example, in the scenario described above with respect to the vehicle 210 and the vehicle 215, the vehicle 215 may have recognized the sub-optimal separation distance and slowed down so as to increase the separation distance and avoid coming in contact with the vehicle 215. In no traffic event has occurred, at block 440, the video sharing group may be disbanded and the actions indicated in block 405 and subsequent blocks carried out.

If, at block 435, the determination indicates the occurrence of a traffic event, at block 445, one or more vehicles that are involved in the traffic event are identified and at block 450, a sub-group is formed. Forming of the video sharing sub-group may include forming of a sub-zone, such as, for example, the sub-zone 305 described above.

At block 455, a sub-group identifier is assigned to the video sharing sub group. In an example implementation, the sub-group identifier is assigned by the first vehicle. Various other items of information such as, for example, a sub-zone identity, a sub-group name, a location identification, and/or a time identification may be associated with the video sharing sub-group.

At block 460, one or more video recordings captured by one or more vehicles and one or more intelligent roadside infrastructure elements may be shared among some or all members of the video sharing group. In an example implementation, the video recording(s) may be shared among all members of the video sharing group. In another example implementation, the video recording(s) is shared among members of the sub-group of the video sharing group. In an example scenario, a video recording captured by the vehicle 115 is shared with the vehicles involved in the traffic event (the vehicle 210 and the vehicle 215 inside the sub-zone 305 and part of the sub-group). Sharing it specifically with the vehicles involved in the traffic event allows the vehicles to forward the video recording to the computer 160 and/or the computer 170 for filing an insurance claim or a police report. When forwarding the video recording the event reporting system of the vehicles may provide additional information such as, for example, insurance information, driver information, vehicle information, and official documents, that may be relevant for purposes of filing the insurance claim or filing the police report.

At block 465, one or more reporting vehicles may be determined. In an example scenario, the determination may be made cooperatively via communications between members of the video sharing group or sub-group. In another example scenario, the determination may be made voluntarily by one or more vehicles and conveyed to other members of the video sharing group or sub-group.

In some cases, the operation indicated at block 465 may be particularly relevant in situations where one or more vehicles involved in the accident are unable to forward a video recording to the computer 160 and/or the computer 170. The individuals may be located inside the vehicle (a driver, for example) and/or outside the vehicle (a pedestrian struck by the vehicle, for example).

At block 470, a reporting vehicle, which can be one of one or more reporting vehicles, may evaluate a video recording to verify, for example, video quality, video content (whether the video recording contains content that is suitable for conveying information about the traffic event), material pertaining to privacy, and security features. In some cases, the reporting vehicle may operate upon the video recording for various reasons such as, for example, to delete irrelevant material, to ensure privacy, and/or to provide security (encoding, for example).

At block 475, the reporting vehicle, which can be one of one or more reporting vehicles, transmits the video recording and supplemental information, to one or more devices such as, for example, the computer 160. In an example scenario, the computer 160 is a server computer as described above. The supplemental information can include, for example, insurance information, driver information, vehicle information, and official documents, that may be relevant for purposes of filing the insurance claim or filing the police report.

At block 480, the receiving device such as, for example, the computer 160 acknowledges receipt of the video recording and the supplemental information.

At block 485, the computer 160 (server computer) makes the video recording and supplemental information accessible to various entities such as, for example, the computer 170. When doing so, the computer 160 may take steps to protect privacy rights and/or to provide security.

At block 490, one or more entities, such as, for example, the computer 170 may access the video recording and/or supplemental information for various purposes such as, for example, to file an insurance claim or to file a police report.

The operations indicated by flowchart 400 can be repeated for subsequent traffic events either in a similar manner or with some modifications. For example, in a scenario where a second traffic event follows a first traffic event over a short period of time, two or more video recordings may be combined or arranged in a manner that allows for performing operations such as associated with evaluation, transmission, and security, efficiently.

Figure 5:
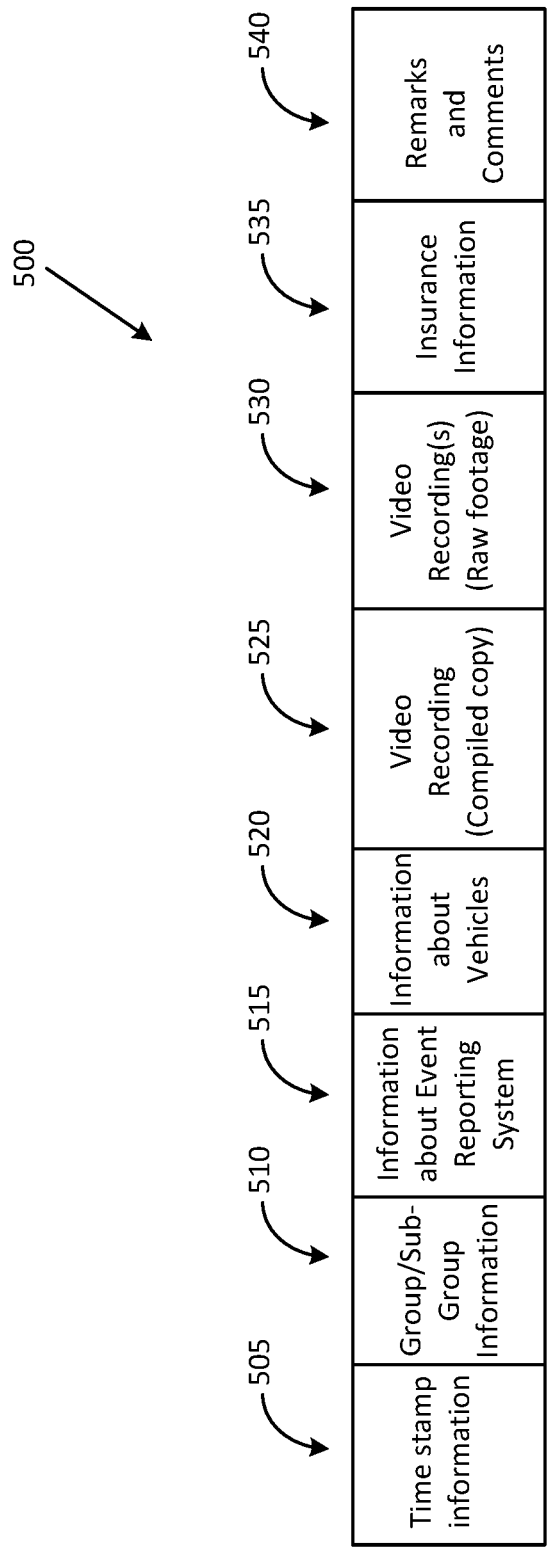
FIG. 5 illustrates an example format of supplemental information that may be transmitted by an event reporting system to a server computer in accordance with disclosure.

FIG. 5 illustrates an example format 500 of supplemental information that may be transmitted by an event reporting system to a server computer in accordance with disclosure. The example format 500 includes various example fields some of which may be omitted in some implementations and some of which may be provided in modified form in some implementations. In some implementations, additional fields may be provided in addition to the example fields shown or in addition to other kinds of fields.

More particularly, the example format 500 includes a field 505 that may contain time stamp information pertaining to a traffic event (for example, a first timestamp that indicates a time when a trigger condition occurred, a second timestamp that indicates a time when traffic event began, a third timestamp that indicates a time when traffic event ended, etc.).

A field 510 may contain group and/or sub-group information (group identifier, for example). A field 515 may contain information about the event reporting systems that is reporting the traffic event (Layer 2 ID information, for example).

A field 520 may contain information about one or more vehicles reporting the traffic event (vehicle identification numbers, for example). A field 525 may contain a video recording that is a compiled copy of multiple video recordings obtained by a reporting vehicle from other vehicles. The other vehicles can be members of a video sharing group and/or of a video sharing sub-group. In an example scenario, the compiled copy may contain video footage of a trigger condition and the traffic event, after deletion of video material that may be irrelevant to the traffic event.

A field 530 may contain raw footage of a video recording that can be an unedited version of one or more video recordings obtained by a reporting vehicle from other vehicles. The other vehicles can be members of a video sharing group and/or of a video sharing sub-group. In an example implementation, either one of the field 525 or the field 530 may be omitted.

A field 535 may contain insurance information of the reporting vehicle and/or of vehicles that may be involved in the traffic event. A field 540 may contain remarks and comments by various individuals such as, for example, from a driver of the reporting vehicle and/or from a witness to the traffic event, Additional fields (not shown) may contain information such as, for example, a health status of an individual involved in a traffic event, witness information, driving records of an individual involved in the traffic event, and/or information about one or more vehicles involved in a traffic event (VIN number, description, condition of vehicle before traffic event, condition of vehicle after traffic event, for example).

Figure 6:
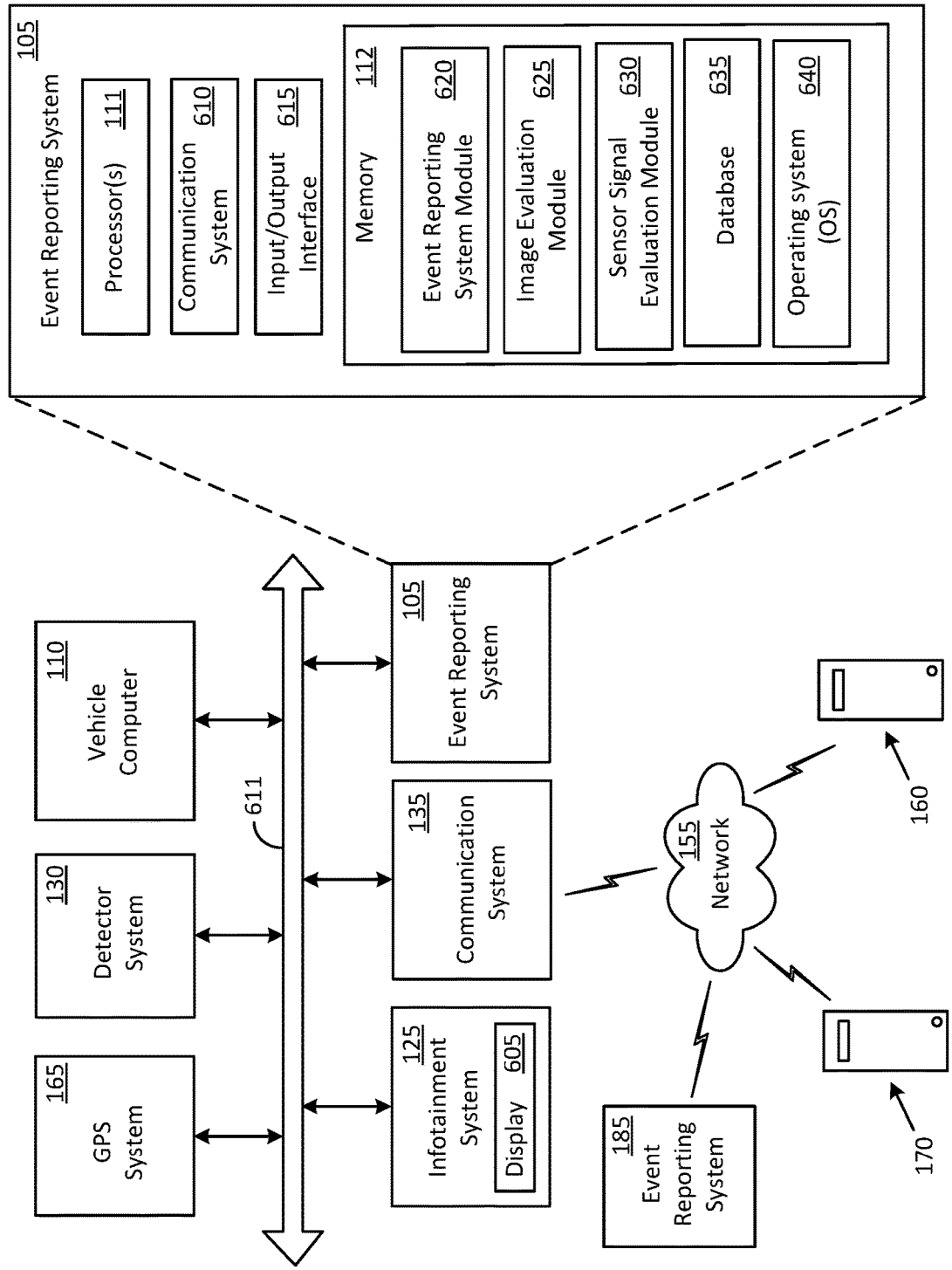
FIG. 6 shows some example components that may be provided in a vehicle in accordance with an embodiment of the disclosure.

FIG. 6 shows some example components that may be included in a vehicle such as, for example, the vehicle 115, in accordance with an embodiment of the disclosure. The example components may include the communication system 135, the vehicle computer 110, the infotainment system 125, the detector system 130, the GPS system 165, and the event reporting system 105.

The various components are communicatively coupled to each other via one or more buses such as, for example, a bus 611. The bus 611 may be implemented using various wired and/or wireless technologies. For example, the bus 611 can be a vehicle bus that uses a controller area network (CAN) bus protocol, a Media Oriented Systems Transport (MOST) bus protocol, and/or a CAN flexible data (CAN-FD) bus protocol. Some or all portions of the bus 611 may also be implemented using wireless technologies such as Bluetooth®, Bluetooth®, Ultra-Wideband, Wi-Fi, Zigbee®, or near-field-communications (NFC). For example, the bus 611 may include a Bluetooth® communication link that allows the event reporting system 105 and the detector system 130 to wirelessly communicate with each other and/or the event reporting system 105 to communicate with the vehicle computer 110.

The communication system 135 can include wired and/or wireless communication devices mounted in or on the vehicle 115 in a manner that support various types of communications such as, for example, communications between the event reporting system 105 and the vehicle computer 110. The communication system 135 may also allow the event reporting system 105 to communicate with devices located outside the vehicle 115, such as, for example, the computer 160, the computer 170, and/or the event reporting system 185.

In an example implementation, the communication system 135 can include a single wireless communication unit that is coupled to a set of wireless communication nodes. In some cases, the wireless communication nodes can include a Bluetooth® low energy module (BLEM) and/or a Bluetooth® low energy antenna module (BLEAM).

The infotainment system 125 can include a display 605 having a GUI for carrying out various operations. The GUI may be used to allow the driver 140 to input information such as, for example, a comment or information pertaining to a traffic event.

The detector system 130 can include various types of devices such as, for example, an accelerometer, a video camera, a digital camera, an infrared camera, an object detector, a distance sensor, a proximity sensor, an audio sensor, a light detection and ranging (LIDAR) device, a radar device, and/or a sonar device.

The GPS system 165 can include a GPS device that communicates with a GPS satellite for obtaining location information, including, for example, a location of the vehicle 115. The location information of the vehicle 115 may be utilized by various entities, such as, for example, the computer 160 to determine a location of the vehicle 115 at the time of occurrence of a trigger condition and/or a traffic event. The location may also be used for purposes such as identifying an angle of video capture of the vehicle event by a camera of the vehicle 115 and relative angles and positions of other vehicles with respect to the vehicle 115

The event reporting system 105 may include a processor 111, a communication system 610, an input/output interface 615, and a memory 112. The communication system 610 can include various types of transceivers that allow the event reporting system 105 to communicate with the vehicle computer 110 (via the bus 611) and other computers (wirelessly via the network 155).

The input/output interface 615 can be used to allow various types of signals and information to pass into, or out of, the event reporting system 105. For example, the input/output interface 615 may be used by the event reporting system 105 to receive a sensor signal from an accelerometer that may be used to identify a driving characteristic of the vehicle 115 (braking, accelerating, etc.).

The memory 112, which is one example of a non-transitory computer-readable medium, may be used to store an operating system (OS) 640, a database 635, and various code modules such as a event reporting system module 620, an image evaluation module 625, and a sensor signal evaluation module 630. The code modules are provided in the form of computer-executable instructions that are executed by the processor 111 to enable the event reporting system 105 to perform various operations in accordance with the disclosure. The event reporting system module 620 can be executed for example, by the processor 111, to perform various operations such as activating a camera to capture a video recording of a traffic event.

Execution of some of these operations can include the use of the image evaluation module 625 in order to evaluate various types of images such as, for example, images captured by the camera 120, the camera 150, the camera 145, and/or the camera 175. The sensor signal evaluation module 630 may be used by the event reporting system module 620 to evaluate various types of sensor signals such as, for example, a sensor signal received from an accelerometer that is a part of the detector system 130.

The database 635 may be used to store various types of data such as, for example, images, vehicle information, driver information, etc.

It must be understood that in various embodiments, actions performed by the processor 111 of the event reporting system 105 can be supplemented, complemented, replicated, or replaced by actions performed by other processors in other computers, such as, for example, the processor 161 in the computer 160 and/or a processor in the event reporting system 185. The actions performed by such other computers may be carried out in cooperation with the processor 111 of the event reporting system 105.

Figure 7:
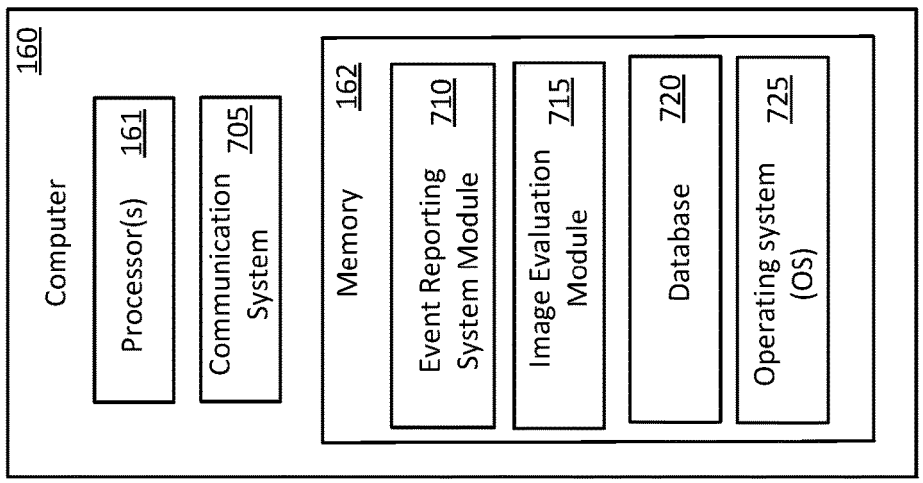
FIG. 7 shows some example components that may be provided in a server computer in accordance with an embodiment of the disclosure.

FIG. 7 shows some functional components that may be included in the computer 160 in accordance with an embodiment of the disclosure. In an example implementation, the computer 160 is a server computer. The example components can include the processor 161, a communication system 705, and the memory 162.

The communication system 705 is configured to allow interactions between the computer 160 and other components such as, for example, the event reporting system 105 of the vehicle 115, the computer 170, and the event reporting system 185. More particularly, in an example implementation, the communication system 705 is configured to receive video recordings from various devices such as, for example, the event reporting system 105 of the vehicle 115.

The memory 162, which is another example of a non-transitory computer-readable medium, may be used to store an operating system (OS) 725, a database 720, and various code modules such as an event reporting system module 710. The code modules are provided in the form of computer-executable instructions that can be executed by the processor 161 for performing various operations in accordance with the disclosure. Execution of some of these operations can include the use of the image evaluation module 715 in order to evaluate various types of images such as, for example, images contained in video recordings provided to the computer 160 by the event reporting system 105 of the vehicle 115.

The database 720 may be used to store information such as, for example, video recordings.

The event reporting system module 710 may be executed by the processor 161 for performing various operations in accordance with the disclosure.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, one skilled in the art will recognize such feature, structure, or characteristic in connection with other embodiments whether or not explicitly described.

Implementations of the systems, apparatuses, devices, and methods disclosed herein may comprise or utilize one or more devices that include hardware, such as, for example, one or more processors and system memory, as discussed herein. An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or any combination of hardwired or wireless) to a computer, the computer properly views the connection as a transmission medium. Transmission media can include a network and/or data links, which can be used to carry desired program code means in the form of computer-executable instructions or data structures and which can be accessed by a general purpose or special purpose computer. Combinations of the above should also be included within the scope of non-transitory computer-readable media.

Computer-executable instructions comprise, for example, instructions and data which, when executed at a processor, such as the processor 111, cause the processor to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

A memory device such as the memory 112, can include any one memory element or a combination of volatile memory elements (e.g., random access memory (RAM, such as DRAM, SRAM, SDRAM, etc.)) and non-volatile memory elements (e.g., ROM, hard drive, tape, CDROM, etc.). Moreover, the memory device may incorporate electronic, magnetic, optical, and/or other types of storage media. In the context of this document, a "non-transitory computer-readable medium" can be, for example but not limited to, an electronic, magnetic, optical, electromagnetic, infrared, or semiconductor system, apparatus, or device. More specific examples (a non-exhaustive list) of the computer-readable medium would include the following: a portable computer diskette (magnetic), a random-access memory (RAM) (electronic), a read-only memory (ROM) (electronic), an erasable programmable read-only memory (EPROM, EEPROM, or Flash memory) (electronic), and a portable compact disc read-only memory (CD ROM) (optical). Note that the computer-readable medium could even be paper or another suitable medium upon which the program is printed, since the program can be electronically captured, for instance, via optical scanning of the paper or other medium, then compiled, interpreted or otherwise processed in a suitable manner if necessary, and then stored in a computer memory.

Those skilled in the art will appreciate that the present disclosure may be practiced in network computing environments with many types of computer system configurations, including in-dash vehicle computers, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by any combination of hardwired and wireless data links) through a network, both perform tasks. In a distributed system environment, program modules may be located in both the local and remote memory storage devices.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description, and claims refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors and may include hardware logic/electrical circuitry controlled by the computer code. These example devices are provided herein for purposes of illustration and are not intended to be limiting. Embodiments of the present disclosure may be implemented in further types of devices, as would be known to persons skilled in the relevant art(s).

At least some embodiments of the present disclosure have been directed to computer program products comprising such logic (e.g., in the form of software) stored on any computer-usable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described example embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A method comprising:
    detecting, by a first vehicle, a trigger condition that portends a traffic event;
    conveying, by the first vehicle to a second vehicle, a request to form a video sharing group comprising the first vehicle and the second vehicle;
    receiving, from the second vehicle, an acceptance to form the video sharing group;
    forming, by the first vehicle, the video sharing group;
    determining, by the first vehicle or the second vehicle, an occurrence of the traffic event;
    capturing, by the first vehicle and/or the second vehicle and based on the occurrence of the traffic event, at least a first video recording of the traffic event; and
    transmitting, by one of the first vehicle or the second vehicle, to a server computer, the first video recording.

2. The method of claim 1, wherein the first vehicle is involved in the traffic event, and wherein forming the video sharing group comprises assigning a group identifier to the video sharing group.

3. The method of claim 2, wherein the group identifier includes at least one of a zone identity, a group name, a location identification, or a time identification.

4. The method of claim 1, wherein the first vehicle is involved in the traffic event, and wherein the method further comprises:
    transmitting, by the first vehicle, to the server computer, insurance information associated with the first vehicle.

5. The method of claim 1, wherein the second vehicle is involved in the traffic event, and wherein the method further comprises:
    transmitting, by the second vehicle, to the server computer, insurance information associated with the second vehicle.

6. The method of claim 1, wherein a third vehicle is involved in the traffic event, and wherein capturing, the first video recording of the traffic event comprises including at least one image of the third vehicle in the first video recording.

7. The method of claim 6, wherein the third vehicle is not a member of the video sharing group.

8. A method comprising:
    detecting, by a first vehicle, a trigger condition that portends a traffic event;
    initiating, by the first vehicle, a first video recording of the trigger condition and the traffic event;
    detecting, by the first vehicle, a second vehicle that is located within a first threshold distance of the first vehicle and/or of a location of the traffic event;
    forming, by at least one of the first vehicle or the second vehicle, a video sharing group comprising the first vehicle and the second vehicle;
    identifying, by the first vehicle and/or the second vehicle, a third vehicle is involved in the traffic event;
    adding the third vehicle to the video sharing group; and
    sharing, by the first vehicle or the second vehicle, the first video recording with the third vehicle.

9. The method of claim 8, further comprising:
    filing an insurance claim or a police report by the vehicle involved in the traffic event, the filing comprising transmitting the first video recording wirelessly to a server computer.

10. The method of claim 8, wherein the the second vehicle also involved in the traffic event, and the sharing including the second vehicle sending the first video recording to the third vehicle.

11. The method of claim 8, further comprising:
    conveying, by the first vehicle to an intelligent roadside infrastructure element, a request to join the video sharing group;
    receiving, from the intelligent roadside infrastructure element an acceptance to join the video sharing group;
    enrolling, by the first vehicle, the intelligent roadside infrastructure element into the video sharing group;
    initiating, by the intelligent roadside infrastructure element, a second video recording of the traffic event; and
    transmitting, by the intelligent roadside infrastructure element, to the third vehicle, the second video recording.

12. The method of claim 11, wherein the first vehicle conveys the request to the intelligent roadside infrastructure element to join the video sharing group, based on detecting the trigger condition that portends the traffic event.

13. The method of claim 12, wherein the first vehicle conveys the request to the intelligent roadside infrastructure element to join the video sharing group based on determining that the intelligent roadside infrastructure element is located within a second threshold distance of the first vehicle and/or the location of the traffic event.

14. A system comprising:
a first vehicle comprising:
a first camera; and
a first event reporting system comprising:
- a first memory that stores computer-executable instructions; and
- a first processor configured to access the first memory and execute the computer-executable instructions to perform operations comprising:
  - detecting a trigger condition that portends a traffic event;
  - operating the first camera to obtain a first video recording of the trigger condition and the traffic event;
  - detecting one or more other vehicles located within a first threshold distance of the first vehicle and/or a location of the trigger condition;
  - forming a video sharing group comprising the first vehicle and the one or more other vehicles;
  - identifying at least one vehicle, from the video sharing group, that is involved in the traffic event; and
  - sharing the first video recording with the at least one vehicle.

15. The system of claim 14, wherein the first processor is further configured to access the first memory and execute the computer-executable instructions to perform operations comprising:
conveying, to the one or more other vehicles, a request to join the video sharing group, based on detecting the trigger condition that portends the traffic event.

16. The system of claim 14, wherein the first processor is further configured to access the first memory and execute the computer-executable instructions to perform operations comprising:
transmitting, to a server computer, the first video recording, to file a police report about the traffic event.

17. The system of claim 14, wherein the one or more other vehicles comprises a second vehicle, the second vehicle comprising:
a second camera; and
a second event reporting system comprising:
- a second memory that stores the computer-executable instructions; and
- a second processor configured to access the second memory and execute the computer-executable instructions to perform operations comprising:
  - receiving, from the first event reporting system of the first vehicle, a request to join the video sharing group;
  - transmitting, to the first event reporting system, an acceptance to join the video sharing group;
  - operating the second camera to obtain a second video recording of the traffic event;
  - sharing the second video recording with at least one vehicle of the video sharing group; and
  - transmitting, to a server computer, the second video recording.

18. The system of claim 14, further comprising:
a second camera; and
an intelligent roadside infrastructure element comprising:
- a second memory that stores computer-executable instructions; and
- a second processor configured to access the second memory and execute the computer-executable instructions to perform operations comprising:
  - receiving, from the first event reporting system of the first vehicle, a request to join the video sharing group;
  - transmitting, to the first event reporting system, an acceptance to join the video sharing group;
  - operating the second camera to obtain a second video recording of the traffic event;
  - sharing the second video recording with at least one vehicle of the video sharing group; and
  - transmitting, to a server computer, the second video recording.

19. The system of claim 18, wherein the first processor of the first event reporting system is further configured to access the first memory and execute the computer-executable instructions to perform operations comprising:
conveying, to the intelligent roadside infrastructure element, the request to join the video sharing group, based on determining that the intelligent roadside infrastructure element is located within a threshold distance of the first vehicle and/or of the location of the trigger condition.

20. The system of claim 18, wherein the first processor is further configured to:
determine, from among the video sharing group, a sub-set of vehicles that are involved in the traffic event, the at least one vehicle being part of the sub-set of vehicles;
create a video sharing sub-group comprising the sub-set of vehicles;
generate a sub-group identifier for the video sharing sub-group; and
share the first video recording among the video sharing sub-group.

* * * * *